United States Patent
Tseng

(10) Patent No.: US 9,025,968 B2
(45) Date of Patent: May 5, 2015

(54) OPTICAL COMMUNICATION DEVICE

(71) Applicant: Hon Hai Precision Industry Co., Ltd., New Taipei (TW)

(72) Inventor: Kuo-Fong Tseng, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 9 days.

(21) Appl. No.: 13/866,036

(22) Filed: Apr. 19, 2013

(65) Prior Publication Data

US 2014/0064741 A1    Mar. 6, 2014

(30) Foreign Application Priority Data

Sep. 5, 2012    (TW) .............................. 101132317 A

(51) Int. Cl.
| | |
|---|---|
| H04B 10/04 | (2006.01) |
| H04B 10/40 | (2013.01) |
| G02B 6/42 | (2006.01) |
| H04B 10/06 | (2006.01) |
| G02B 6/43 | (2006.01) |

(52) U.S. Cl.
CPC ................ *H04B 10/40* (2013.01); *G02B 6/423* (2013.01); *G02B 6/43* (2013.01)

(58) Field of Classification Search
USPC ........ 398/182, 200, 202, 214; 385/14, 15, 39, 385/51, 52, 76, 77
See application file for complete search history.

(56) References Cited

U.S. PATENT DOCUMENTS

| | | | |
|---|---|---|---|
| 6,246,708 B1 * | 6/2001 | Thornton et al. ........ 372/50.124 |
| 2005/0286597 A1 * | 12/2005 | Mukoyama et al. ....... 372/50.23 |
| 2006/0039658 A1 * | 2/2006 | Furuyama et al. .............. 385/90 |

* cited by examiner

*Primary Examiner* — Daniel Dobson
(74) *Attorney, Agent, or Firm* — Novak Druce Connolly Bove + Quigg LLP

(57) ABSTRACT

An optical communication device includes a substrate, a photoelectric element for emitting/receiving optical signals, a driver chip for driving the photoelectric, and a light waveguide for transmitting optical signals. The substrate defines a through fixing hole. The photoelectric element and the driver chip are electrically connected to the substrate. The photoelectric element includes a base portion and an optical portion formed on the base portion. The optical portion includes an optical surface serving as a light emergent/incident surface, the optical surface faces toward the substrate, and the optical portion is aligned with the fixing hole. An end of the light waveguide is inserted and fixed into the fixing hole and is optically aligned with the optical portion.

8 Claims, 1 Drawing Sheet

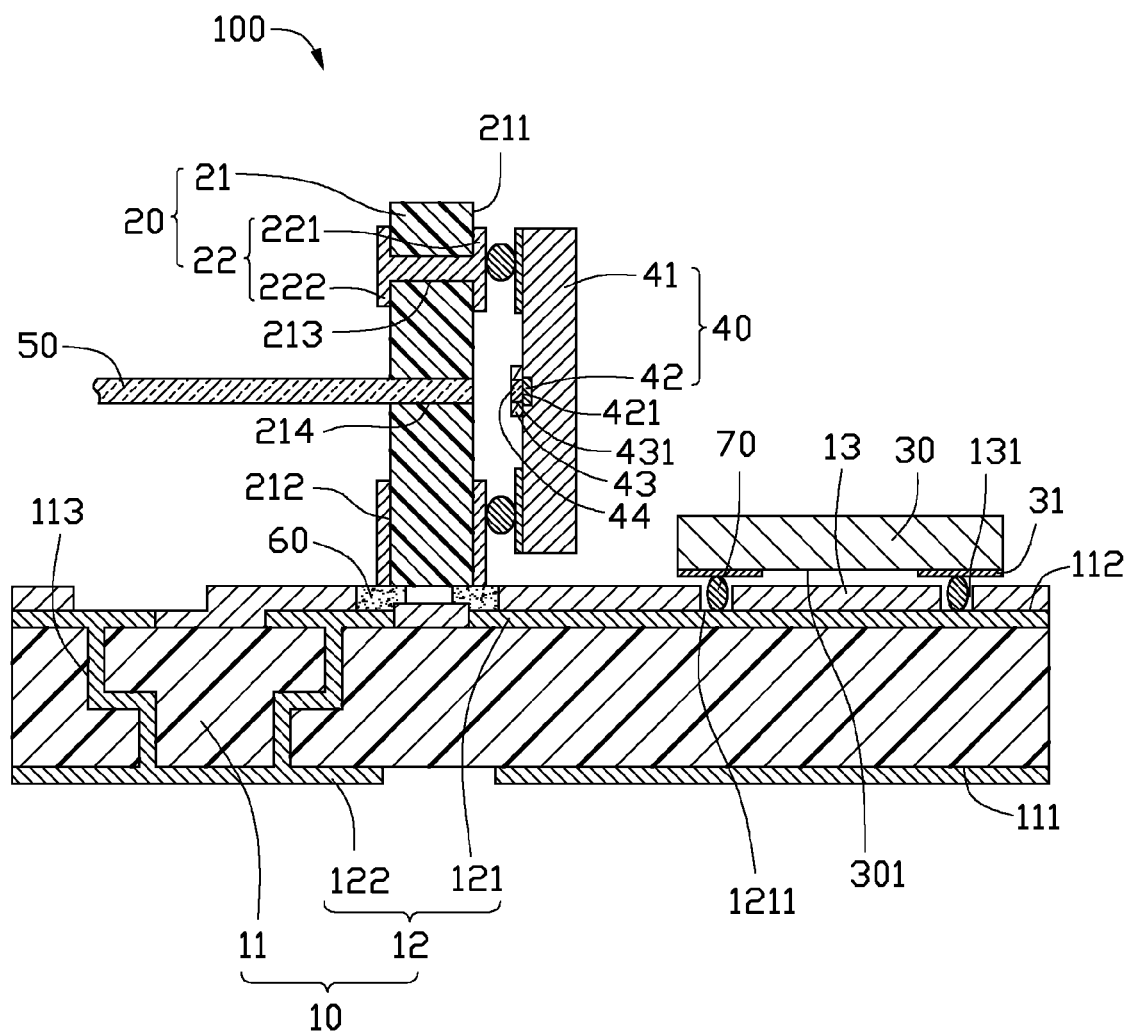

OPTICAL COMMUNICATION DEVICE

BACKGROUND

1. Technical Field

The present disclosure relates to communication devices and, particularly, to an optical communication device.

2. Description of Related Art

An optical communication device includes a substrate, at least one photoelectric element positioned on the substrate for emitting/receiving electrical signals, and a light waveguide transmitting optical signals. The photoelectric element emits/receives optical signals with a transmitting direction substantially perpendicular to the substrate, and a transmitting direction of optical signals in the light waveguide is substantially parallel to the substrate. Therefore, a transmitting direction of optical signals should be deflected for substantially 90 degrees to optically couple the photoelectric element with the light waveguide. In the current optical communication device, a complex coupler is adapted to deflect a transmitting direction of optical signal for 90 degrees for optically coupling the photoelectric element with the light waveguide. However, the coupler increases an assembling difficulty and cost of the optical communication device.

What is needed therefore is an optical communication device addressing the limitations described.

BRIEF DESCRIPTION OF THE DRAWINGS

The components of the drawings are not necessarily drawn to scale, the emphasis instead being placed upon clearly illustrating the principles of the embodiments of the present disclosure. Moreover, in the drawings, like reference numerals designate corresponding parts throughout several views.

The FIGURE is a schematic view of an optical communication device, according to an exemplary embodiment of the present disclosure.

DETAILED DESCRIPTION

FIG. 1 shows an optical communication device 100, according to an exemplary embodiment. The optical communication device 100 includes a first substrate 10, a second substrate 20, a driver chip 30, a photoelectric element 40, and a light waveguide 50.

The first substrate 10 includes a first base layer 11 and a first conductive circuit 12 formed on the first base layer 11. The first base layer 11 includes a first surface 111 and an opposite second surface 112. The first base layer 11 defines a number of first through holes 113 passing through the first surface 111 and the second surface 112. A conductive material is filled in the first through holes 113. In this embodiment, a material of the first base layer 11 is silicon, and the first through holes 113 are formed by a technology of through silicon via (TSV). The first conductive circuit 12 includes a first circuit portion 121 formed on the second surface 112 and a second circuit portion 122 formed on the first surface 111. The conductive material electrically connects the first circuit portion 121 and the second circuit portion 122 to each other in the first through holes 113. The first circuit portion 121 and the second circuit portion 122 are made from a material of high conductivity, such as gold, silver, and copper. The first circuit portion 121 includes a number of first electric contacts 1211 for electrically connecting the driver chip 30 and the second substrate 20.

The first substrate 10 further includes a solder resist layer 13 covering the first circuit portion 121. The solder resist layer 13 defines a number of openings 131 corresponding to the electric contacts 1211. Each opening 131 exposes a corresponding electric contact 1211 out of the resist layer 13.

The second substrate 20 includes a second base layer 21 and a second conductive circuit 22 formed on the second base layer 21. The second base layer 21 includes a first side surface 211 and an opposite second side surface 212. The second base layer 21 defines a number of second through holes 213 and a fixing hole 214 passing through the first side surface 211 and the second side surface 212. A conductive material is filled in the second through holes 213. The second through holes 213 and the fixing hole 214 are formed by a technology similar to that of the first through holes 113. The second conductive circuit 22 includes a third circuit portion 221 formed on the first side surface 211 and a fourth circuit portion 222 formed on the second side surface 212. The conductive material electrically connects the third circuit portion 221 and the fourth circuit portion 222 to each other in the second through holes 213. The third circuit portion 221 and the second circuit portion 222 are made from a material similar as the first and second circuit portions 121, 122.

The second substrate 20 is mechanically and electrically connected to the first substrate 10. The second conductive circuit 22 is electrically connected to the first conductive circuit 12 by the corresponding electric contacts 1211. The first and second side surfaces 211, 212 of the second substrate 20 are substantially perpendicular to the first and second surfaces 111, 112 of the first substrate 10. In this embodiment, the second substrate 20 and the first substrate 10 are mechanically and electrically connected to each other by a conductive adhesive 60 filled in the corresponding opening 131.

The driver chip 30 is positioned on the first surface 111 of the first substrate 10. The driver chip 30 includes a mounting surface 301 and a number of connecting pins 31 formed on the mounting surface 301. The driver chip 30 is mechanically and is electrically connected to the first substrate 10 with the mounting surface 301 facing toward the second surface 112. In this embodiment, the driver chip 30 is connected to the first substrate 10 by a manner of flip chip. In detail, the connecting pins 31 are electrically connected to the corresponding electric contacts 1221 by a number of corresponding soldering balls 70.

The photoelectric element 40 is configured for emitting/receiving optical signals. The photoelectric element 40 may be a laser diode, a photodiode, or a combination of a laser diode and a photodiode. The photoelectric element 40 includes a base portion 41 and an optical portion 42 formed on the base portion 41. The photoelectric element 40 emits/receives optical signals via the optical portion 42. The optical portion 42 includes an optical surface 421 serves an emergent/incident surface of optical signals. The photoelectric element 40 includes a light shielding sheet 43 covering the optical portion 42. The light shielding sheet 43 is made from an opaque material. In this embodiment, the light shielding sheet 43 is made from metal. The light shielding sheet 43 defines an aperture 431. The aperture 431 exposes a predetermined shaped and sized area of the optical surface 421 out of the shielding sheet 43, thus the aperture 431 forms an optical signal transmitting channel of the photoelectric element 40. The photoelectric element 40 further includes a transparent film 44 in the aperture 42 for protecting the optical surface 421 from being damaged or polluted. The photoelectric element 40 is mechanically and is electrically connected to the second substrate 20 via a manner similar as an interconnection between the driver chip 30 and the first substrate 10. The optical surface 421 of optical portion 42 faces toward the first side surface 211, and the aperture 431 is aligned with the fixing hole 214.

The light waveguide 50 is configured transmitting optical signals. The light waveguide 50 can be an optical fiber or a planar light waveguide. In this embodiment, the light waveguide 50 is an optical fiber. An end of the light waveguide 50 is inserted and is fixed into to the fixing hole 214, thus the optical fiber 50 is optically aligned with the optical portion 42 of the photoelectric element 40.

The optical communication device 100 employs the second substrate 20 perpendicularly connected to the first substrate 10, the photoelectric element 40 is connected to the second substrate 20 with the optical surface 421 facing a direction substantially parallel to the first substrate 10, and the light waveguide 50 is positioned substantially parallel to the first substrate 10. Therefore, optical signals can be transmitted between the light waveguide 50 and the photoelectric element 40 along a linear direction, it is no need to bend the optical waveguide or adapt a coupler to deflecting optical signals. Accordingly, an assembling difficulty and cost of the optical communication device are decreased.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. An optical communication device, comprising:
   a substrate, the substrate defining a through fixing hole;
   a photoelectric element electrically connected to the substrate for emitting/receiving optical signals, the photoelectric element comprising a base portion and an optical portion on the base portion, the optical portion comprising an optical surface serving as a light emergent/incident surface, the optical surface facing toward the substrate, and the optical portion aligned with the fixing hole;
   a driver chip electrically connected to the substrate for driving the photoelectric element; and
   a light waveguide for transmitting optical signals, an end of the light waveguide being inserted and fixed into the fixing hole and optically aligned with the optical portion,
   wherein the photoelectric element comprises a light shielding sheet covering the optical portion, the light shielding sheet defines an aperture exposing a predetermined shaped and sized area of the optical surface out of the shielding sheet, and the aperture is aligned with the fixing hole;
   wherein the photoelectric element comprises a transparent film in the aperture.

2. An optical communication device, comprising:
   a substrate, the substrate defining a through fixing hole;
   a photoelectric element electrically connected to the substrate for emitting/receiving optical signals, the photoelectric element comprising a base portion and an optical portion on the base portion, the optical portion comprising an optical surface serving as a light emergent/incident surface, the optical surface facing toward the substrate, and the optical portion aligned with the fixing hole;
   a driver chip electrically connected to the substrate for driving the photoelectric element; and
   a light waveguide for transmitting optical signals, an end of the light waveguide being inserted and fixed into the fixing hole and optically aligned with the optical portion,
   wherein the substrate comprises a first substrate and a second substrate mechanically and electrically connected to the first substrate, the first substrate is substantially perpendicular to the second substrate, the driver chip is connected to the first substrate, and the fixing hole is defined in the second substrate.

3. The optical communication device of claim 2, wherein the first substrate comprises a first base layer and a first conductive circuit formed on the first base layer, the second substrate comprises a second base layer and a second conductive circuit formed on the first base layer, the chip driver is electrically connected to the first conductive circuit, the photoelectric element is electrically connected to the second conductive circuit, and the first conductive circuit is electrically connected to the second conductive circuit.

4. The optical communication device of claim 3, wherein the first base layer comprises a first surface and a second surface opposite to the first surface, the second base layer comprises a third side surface and a fourth side surface opposite to the third surface, the first surface is substantially perpendicular to the third side surface, the chip driver is positioned on the first surface, and the photoelectric element is positioned on the third side surface.

5. The optical communication device of claim 3, wherein the first base layer defines a plurality of first through holes passing through the first surface and the second surface, the first conductive circuit comprises a first circuit portion on the first surface and a second circuit portion on the second surface, the first circuit portion and the second circuit portion are electrically connected to each other via the first through holes.

6. The optical communication device of claim 5, wherein the first circuit portion comprises a plurality of electric contacts electrically connecting the driver chip.

7. The optical communication device of claim 6, wherein the first substrate comprises a solder resist layer covering the first circuit portion, the solder resist layer defines a plurality of openings corresponding to the electric contacts, and each opening exposes a corresponding electric contact out of the solder resist layer.

8. The optical communication device of claim 3, wherein the second base layer defines a plurality of second through holes and the through fixing hole passing through the third side surface and the four side surface, the second conductive circuit comprises a third circuit portion on the third side surface and a fourth circuit portion on the fourth side surface, the third circuit portion and the fourth circuit portion are electrically connected to each other via the second through holes.

* * * * *